United States Patent [19]

Okuhara et al.

[11] Patent Number: 4,575,119
[45] Date of Patent: Mar. 11, 1986

[54] SEAT BELT DEVICE

[75] Inventors: Hisakazu Okuhara; Kazuo Higuchi, both of Tochigi; Kiichi Sasaki, Saitama, all of Japan

[73] Assignee: Honda Giken Kogyo Kabushiki Kaisha, Tokyo, Japan

[21] Appl. No.: 581,088

[22] Filed: Feb. 17, 1984

[30] Foreign Application Priority Data

Feb. 17, 1983 [JP] Japan ............................ 58-25325

[51] Int. Cl.⁴ ............................................ B60R 22/48
[52] U.S. Cl. ............................................................ 280/801
[58] Field of Search ...................... 280/801, 807, 808; 297/474, 475, 481, 482, 483

[56] References Cited

U.S. PATENT DOCUMENTS 4,231,592  11/1980  Scherenberg et al. ............. 280/808
4,371,192   2/1983  Alix ................................... 280/801

FOREIGN PATENT DOCUMENTS 2302541  7/1974  Fed. Rep. of Germany ...... 280/801
2635349  2/1978  Fed. Rep. of Germany ...... 280/807
1570459  7/1980  United Kingdom ............... 280/801

Primary Examiner—Joseph F. Peters, Jr.
Assistant Examiner—Ross Weaver
Attorney, Agent, or Firm—Lyon & Lyon

[57] ABSTRACT

A seat belt device including a webbing having one end movable back and forth with a lever. The webbing has an opposite end connected to a retractor and an intermediate portion extending loosely through a through anchor. The lever has a lower end pivotally mounted on an automobile body, and an upper movable end to which the end of the webbing is secured. To allow the lever to be moved with a small driving force, front and rear limits of the range of angular movement of the upper end of the lever are positioned symmetrically with respect to a straight line passing through the through anchor and the lower end of the anchor, and the retractor has a winding limiting mechanism for keeping a predetermined length of webbing unwound.

7 Claims, 12 Drawing Figures

SEAT BELT DEVICE

BACKGROUND OF THE INVENTION

1. Field of the Invention

The present invention relates to a three-point seat belt device, and more particularly to a three-point seat belt device having a webbing with its one end movable by a swingable lever.

2. Description of the Prior Art

There is known a three-point seat belt device or a combination lap and shoulder belt device having a single webbing or use in automobiles. In such a prior seat belt device, the webbing is unreeled from a retractor mounted on a side wall of an automobile compartment and threaded through a through anchor attached to an inner surface of a center pillar, the webbing having an end fixed to an automobile body side seal disposed laterally of a passenger's seat. The webbing carries thereon a tongue plate at a position between the through anchor and the webbing end. The tongue plate is engageable with a buckle located laterally of the seat near the center of the automobile body for holding the webbing against the shoulder and waist of a passenger sitting on the seat. For allowing the passenger to fasten the seat belt with ease, it is necessary to set the end of the webbing in such a position that a portion of the webbing in the vicinity of the tongue plate should be located in front of the back of the seat. However, there was a dilemma that setting of webbing in such position causes the interference of the webbing with the passenger while his getting on or off the seat.

To solve such a dilemma, Japanese Laid-Open Utility Model Publication No. 121020/1977 has proposed a seat belt device, wherein a lever is mounted on a side of the seat facing the door swingably in the back-and-forth direction, and the end of the webbing is secured to the lever. The lever is turned foward when the seat belt is to be fastened, and is turned backward when the passenger is to get on or off the seat. This seat belt device has been effective in improving the ease with which the seat belt is fastened and the passenger gets on and off the seat. However, there was a problem with the disclosed seat belt device that a large drive force is required to turn the lever back and forth. The problem will hereinafter be described in detail with reference to FIG. 12 of the accompanying drawings.

Designated in FIG. 12 at D is a position where a through anchor is attached to an automobile body, and E a position where the swingable lever is coupled to the automobile body. An arc ABC indicates a path of movement of the movable end of the lever to which the end of the webbing is secured. Also denoted at A and C are rear and front limit positions of the range in which the movable end of the lever is movable, and B is a point where a straight line DE intersects the arc ABC. When the lever is angularly moved forward from the rear limit, the upper end of the lever is moved from the point A to the point B at the first stage. On such angular movement of the lever, an initial distance $\overline{AD}$ between the through anchor and the upper end of the lever is reduced to a distance $\overline{BD}$, and hence the webbing is wound into the retractor by the length equal to the difference between distances $\overline{AD}$ and $\overline{BD}$. Continued forward angular movement of the lever brings the upper end thereof to the point C, during which the distance between the through anchor and the upper end of the lever is increased by the difference between $\overline{CD}$ and $\overline{BD}$. Accordingly, the corresponding length of the webbing should be pulled out of the retractor against the winding force of the retractor. The lever therefore requires a large drive force for the latter half of the forward angular movement. Similarly, the lever requires a large drive force for the latter half of the rearward angular movement thereof.

If the lever is angularly moved back and forth by a motor, the motor should have a large capacity. If the lever is turned back and forth by a control wire or the like which are coupled with a door, the opening and closing of the door should be rendered relatively heavy.

Another drawback is that the lever is subject to the winding force from the retractor at all times so that it is difficult to move the lever accurately into and hold it stably at the front and rear limit positions.

SUMMARY OF THE INVENTION

The present invention has been made in an effort to eliminate the foregoing shortcomings.

According to the present invention, the seat belt device for a seat of a vehicle comprises a webbing, a retractor mounted on the inner wall of the vehicle body for winding up the webbing, a through anchor mounted on the vehicle body and above the retractor, a lever connected at one end thereof to a part of the vehicle body swingably in the back-and-forth direction with respect to the vehicle body. The webbing has a first end thereof coupled to the retractor, a second end thereof secured to a movable end of the lever, and an intermediate portion thereof extending loosely through the through anchor. The seat belt device also includes drive means for driving the lever to move between a relatively forward first position and a relatively rearward second position. The position of the movable end of the lever at the time when the lever is in the first postion and the position of the movable end of the lever at the time when the lever is in the second postion are substantially symmetrical with respect to the straight line passing through the through anchor and the connecting point where the lever is connected to the vehicle body. The retractor includes winding limiting mechanism for limiting winding operation of the retractor to keep a predetermined length of the webbing unwound.

Accordingly, it is an object of the present invention to provide a three-point seat belt device having a webbing with its one end movable by a swingable lever which can be driven with a relatively small force while ensuring a sufficient operation.

Another object of the present invention is to provide a three-point seat belt device having a webbing with its one end movable by a swingable lever, wherein the lever is adapted to be stopped in an optimum position at all times in order to allow a passenger to get on and off a seat with great ease and to provide a better fittability of the webbing to the passenger when fastened.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
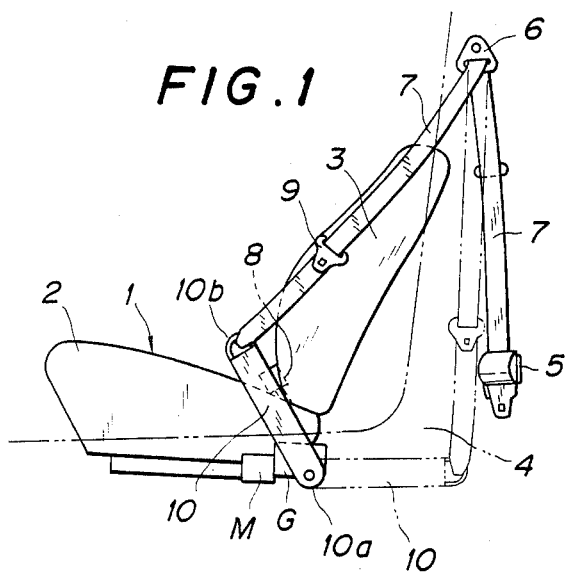
FIG. 1 is a side elevational view of a seat belt device according to a first embodiment of the present invention.

FIG. 1 illustrates a seat belt device constructed in accordance with a first embodiment of the present invention.

A front seat 1 disposed in an automobile compartment in an automobile body 4 is composed of a seat bottom 2 and a seat back 3. A retractor 5 for winding up a seat belt or webbing 7 is attached to an inner wall of the compartment behind the front seat 1. A through anchor is mounted on the inner wall of the compartment upwardly of the retractor 5. The webbing 7 is unreeled from the retractor 5 and loosely threaded through the through anchor 6. The webbing carries thereon a tongue plate 9 at a position intermediate between its end and the through anchor, the tongue plate 9 being engageable with a buckle 8 located laterally of the seat 1 near the center of the automobile body.

A lever 10 is pivotally mounted at a lower end 10a thereof on the floor of the compartment adjacent to a rear end of the seat and a door. The lever 10 is swingable back and forth alongside of the seat 1. The end of the webbing 7 is secured to an upper end 10b of the lever 10. The lever 10 is angularly moved back and forth by a drive unit composed of a motor M and a gear G for transmitting power from the motor M. The drive unit however may be replaced with a mechanical means such as a control wire, a rod mechcanism, or any other known mechanism.

When a passenger is to get on or off the seat 1, the lever 10 lies, as shown by the imaginary lines in FIG. 1, along the floor at substantially the same level as that of the floor so as not to interfere with the passenger. When the webbing 7 is to be fastened, the lever 10 is turned forward until the upper end 10b is located upwardly of the upper surface of the seat bottom 2 and forward of the front surface of the seat back 3 as shown by the solid lines in FIG. 1, so that the tongue plate 9 will easily be caught by the passenger.

Figure 3:
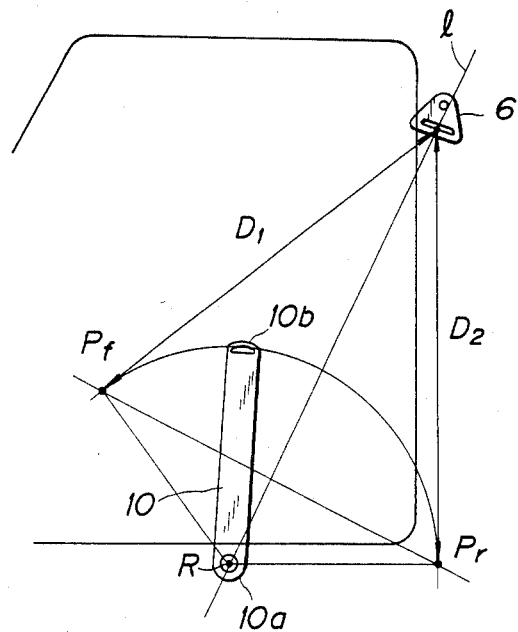
FIG. 3 is a schematic diagram showing the geometry of parts of the seat belt device illustrated in FIG. 1.

The position of the through anchor 6, the position of the lower end 10a of the lever 10, at which the lever is mounted on the floor, and the respective positions of the upper end 10b of the lever 10 when the lever is located in front and rear limits of its range of angular movement are arranged as illustrated in FIG. 3. The upper end 10b of the lever 10 is located in positions Pf and Pr when the lever 10 is in the front and rear limits, respectively, of the range of its angular movement. These front and rear positions Pf, Pr are located symmetrically with respect to a line 1 passing through the through anchor 6 and a pivotal point R of the lower end 10a of the lever 10. Accordingly, the distance $D_1$ between the front position Pf of the upper end 10b and the through anchor 6 is equal to the distance $D_2$ between the rear position Pr of the upper end 10b and the through anchor 6.

Figure 2:
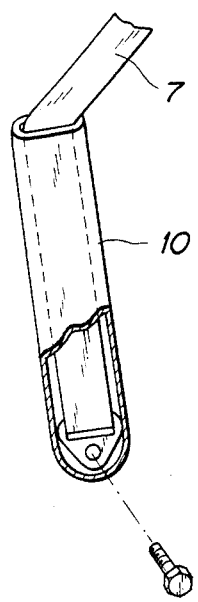
FIG. 2 is a perspective view, partly cut away, of a lever used in a modification of the seat belt device according to the first embodiment of the present invention.

In this embodiment, the end of the webbing 7 is secured to the lever 10 by connecting the end of the webbing 7 directly to the upper end 10b of the rod-shaped lever 10. However, the end of the webbing may be secured to the lever in other manners. FIG. 2 shows a modified lever to which the webbing 7 is secured. The lever 10 shown in FIG. 2 is of a hollow shape having an opening in its upper end. The end of the webbing 7 is inserted through the upper opening into the lever 10 and connected to the lever 10 at the lower end of the lever 10. The end of the webbing 7 may however be connected anywhere in the lever 10.

Figure 4:
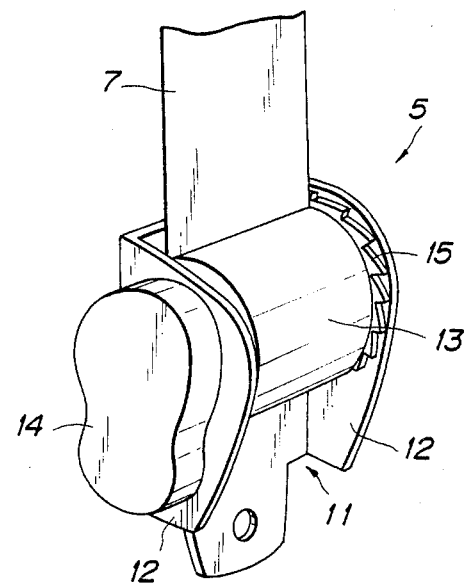
FIG. 4 is an enlarged perspective view of a retractor in the seat belt device of FIG. 1.

FIG. 4 illustrates the retractor 5 in greater detail. The retractor 5 comprises a housing 11 having a pair of spaced brackets 12 and fixed to the automobile body 4, and a takeup drum 13 rotatably disposed between the brackets 12 for winding the webbing 7. The takeup drum 13 is normally urged in a direction to wind the webbing 7 thereon by a spring interposed and acting between one of the brackets 12 and the drum 13 and housed in a cover 14. The retractor 5 also includes an emergency lock 15 of known construction disposed between the takeup drum 13 and the other bracket 12 for preventing the webbing 7 from being unreeled in case of emergency.

Figure 5:
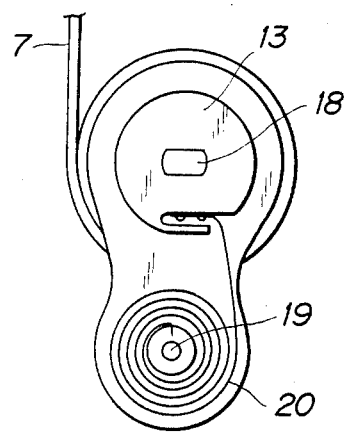
FIG. 5 is a side elevational view of a winding limiting mechanism in the retractor shown in FIG. 4.

Specifically, the retractor 5 according to the present invention has a winding limiting mechanism for keeping a predetermined length of the webbing 7 unreeled from the retractor 5, when winding the webbing 7 in the retractor 5. The retractor 5 according to the first embodiment has a winding limiting mechanism incorporating a webbing takeup spring 20 as shown in FIG. 5. For an easier understanding of the invention, however, several winding limiting mechanisms separate from the webbing takeup spring will first be described as modifications of the winding limiting mechanism used in the first embodiment.

Figure 6:
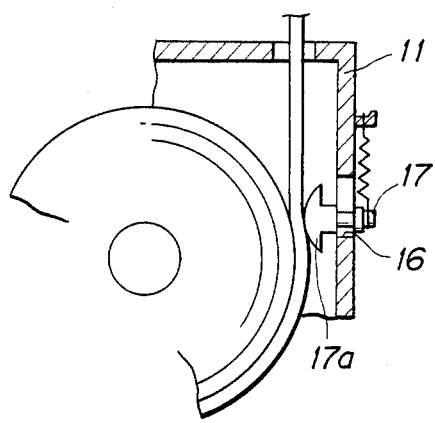
FIGS. 6 and 7 are side elevational views, partly in cross section, of modified winding limiting mechanisms.

FIG. 6 shows one of such winding limiting mechanisms including a housing 11 having a slot 16 defined near a webbing outlet and extending in the direction in which the webbing 7 is reeled and unreeled. A slider 17 is inserted in the slot 16 and normally biased by a spring to the direction to unreel the webbing 7. As the webbing 7 is wound on the takeup drum 13, the diameter of the role of the webbing 7 becomes greater until the webbing roll comes into contact with a free end 17a of the slider 17, which is then caused to move toward the end of the slot 16 closer to the takeup drum 13. This increases friction between the slider 17 and the webbing 7 to stop the rotation of the webbing roll to prevent the webbing 7 to be further wound on the takeup drum 13.

Figure 7:
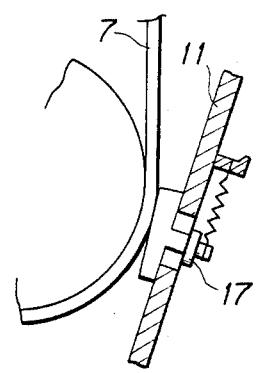

FIG. 7 shows another winding limiting mechanism which is similar to the mechanism of FIG. 6 in that it includes a housing 11 provided with a slide 17, a slot, and a spring. The winding limiting mechanism of FIG. 7 differs from that of FIG. 6 in that the slider 17 is wedge-shaped and hence the slot in which the slider 17 is inserted can be located not only near the webbing outlet, but anywhere as long as it confronts the webbing roll.

It is possible to obtain the winding limiting function without such slides as mentioned above, but with just a projection fixed to the inner surface of the housing and adapted to come into contact with the webbing roll when the webbing is wound to be a thick roll. With this arrangement, however, the position where the webbing would stop against being wound further would become unstable, and no accurate unwound length of the webbing would be ensured. When pulling out the webbing after it has been wound to its limit, a large unreeling force would be necessary to overcome friction between the webbing and the fixed projection. According to the winding limiting mechanisms shown in FIGS. 6 and 7, the slider will be moved to the slot end, where the friction between the slider and the webbing is larger, as soon as the slider contacts the webbing roll, thus allowing the webbing to be kept unwound by an accurate length. When the webbing is to be unreeled, no large unreeling force is required as the slider is moved to the other slot end, where the friction between the slider and the webbing is smaller.

The winding limiting mechanism shown in FIG. 5 is employed in the retractor used in the seat belt device according to the first embodiment. The winding limiting mechanism has a shaft 19 for the spring 20 disposed parallelly to a shaft 18 of the takeup drum 13. The spring 20 comprises a reversal flat spiral spring having an outer end fastened to the drum 13. As long as only the prescribed length of the webbing which should remain unwound is unreeled, the entire spring 20 is wound on a collar rotatably fitted over the shaft 19, and the drum 13 does not undergo any torque due to the spring 20. As the webbing 7 is progressively unreeled, the spring 20 is also unreeled from the shaft 19 and wound around the drum 13 in a direction opposite to that in which the spring 20 is initially wound around the shaft 19. The drum 13 is now subjected to a force tending to rotate same in a direction to wind the webbing 7. The reversal flat spiral spring requires the passenger to exert a substantially constant unreeling force unlike an ordinary flat spiral spring which would need a greater unreeling force as the webbing would be pulled out by a larger length. The reversal flat spiral spring is also advantageous in that the torque on the takeup drum can be of a low setting at the time the webbing is pulled out to a maximum length and hence the inertia produced upon winding the webbing can be lowered.

Figure 8:
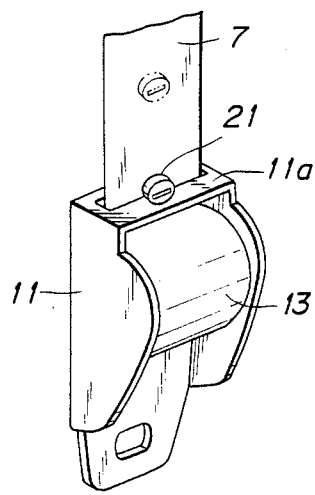
FIG. 8 is a perspective view of another modified winding limiting mechanism.
Figure 9:
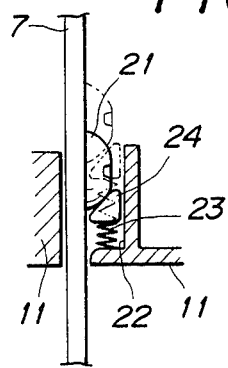
FIGS. 9 and 10 are side elevational views, partly in cross section, of other modified winding limiting mechanisms.
Figure 10:
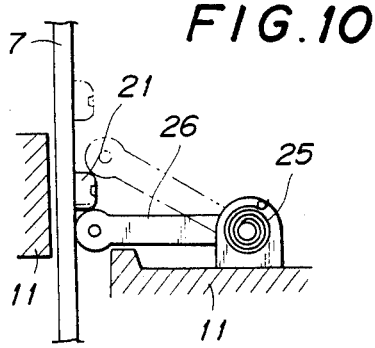
Figure 12:
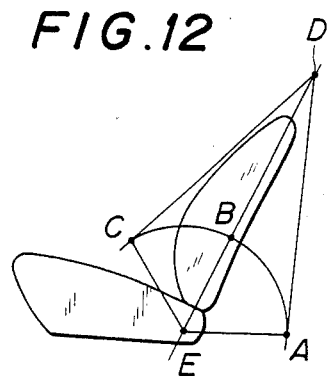
FIG. 12 is a schematic diagram explanatory of lengths of a webbing to be unreeled and wound in a conventional three-point seat belt device.

FIGS. 8 through 10 illustrate other modified winding limiting mechanisms in which a stop 21 is positionally adjustably attached to the webbing 7 so that the length of the webbing 7 to be kept unwound can easily be changed. According to the winding limiting mechanism shown in FIG. 8, the stop 21 attached to the webbing 7 is brought into abutting engagement with an upper surface of the housing 11 to prevent the webbing 7 from being wound further. With the winding limiting mechanism shown in FIG. 9, the housing 11 has a recess 22 in alignment with the stop 21 on the webbing 7, and a slider 24 biased by a spring 23 is fitted in the recess 22. Any impact shock at the time the stop 21 hits the slider 24 is absorbed by the spring 23 as the slider 24 is resiliently retracted. The winding limiting mechanism shown in FIG. 9 has an arm 26 normally urged by a spring 25 to move upwardly. The spring-biased arm 26 can absorb any impact shock when the stop 21 on the webbing 7 hits the distal end of the arm 26.

The length of the part of the webbing 7 which is to be kept unwound by the winding limiting mechanism is set such that the unwound part of the webbing 7 has neither any significant sagging nor tension from the retractor when the upper end 10b of the lever 10 is located in the front limit position Pf thereof and when in the rear limit position Pr thereof. Stated otherwise, the webbing 7 is stopped by the winding limiting mechanism against being wound further, keeping the length of the webbing unwound ahead of the through anchor, which length is slightly greater than and substantially equal to the distance $D_1$ ($=D_2$).

Figure 11:
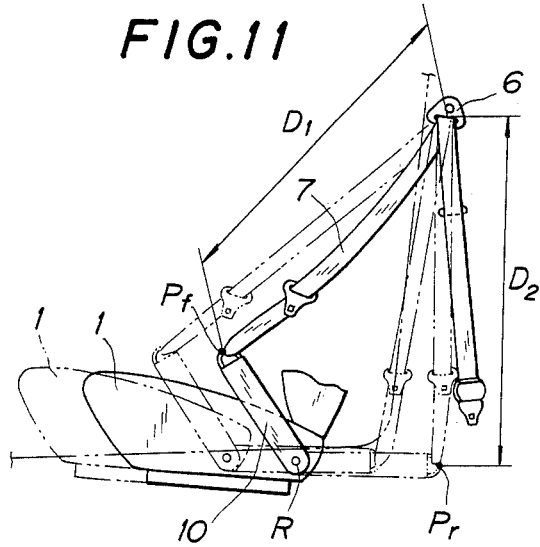
FIG. 11 is a side elevational view of a seat belt device according to a second embodiment of the present invention.

FIG. 11 shows a seat belt device according to a second embodiment of the present invention, the seat belt device being combined with a slidable seat 1. The seat belt device shown in FIG. 11 differs from the seat belt device of the first embodiment only as to the manner in which the lower end of the lever 10 is pivotally mounted. More speficially, the lower end of the lever 10 is mounted on a lower and rear portion of the seat 1, rather than the floor. The distance $D_1$ between the anchor 6 and the front limit position Pf of the angular movement of the upper end of the lever 10 and the distance $D_2$ between the anchor 6 and the rear limit position Pr of the angular movement of the upper end of the lever 10 vary, as the seat 1 is slidably adjusted back and forth in position. The length of the webbing which is to be kept unwound is set such that no tension from the retractor acts on the webbing when the distances $D_1$, $D_2$ are maximized by the seat adjustment. The point R where the lever 10 is pivotally counpled to the seat 1 is positoned such that the webbing will not significantly sag when the distances $D_1$, $D_2$ are rendered smallest by the seat adjustment. Accordingly, the front and rear limits positions Pf and Pr of the upper end of the lever 10 can not exactly, however may substantially be symmetrical with respect to a straight line passing through the point R and the anchor 6. Although the webbing 7 has a little sagging in this embodiment, the advantages of the seat belt device of the present invention will not be injured by such a little sagging. Further, since the position of the upper end of the liver 10 with respect to the seat 1 remains unchanged even when the seat is slidably adjusted back and forth in this embodiment, the webbing can be held in the vicinity of an optimum position at all times to provide a better fittability to passenger sitting on the seat. The above-described embodiments can be chosen for the purpose of actual applications.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

What is claimed is:

1. A seat belt device for a seat of a vehicle, comprising:
   (a) a webbing;
   (b) a retractor mounted on the inner wall of the vehicle body for winding up said webbing;

(c) a through anchor mounted on the vehicle body and above said retractor;
(d) a lever connected at one end thereof to a part of the vehicle body swingably in the back-and-forth direction with respect to the vehicle body;
(e) said webbing having a first end thereof coupled to said retractor, a second end thereof secured to a movable end of said lever, and an intermediate portion thereof loosely inserted through said through anchor;
(f) drive means for driving said lever to move between a relatively forward first position and a relatively rearward second position;
(g) the position of said movable end of said lever at the time when said lever is in said first position and the position of said movable end of said lever at the time when said lever is in said second position being substantially symmetrical with respect to a straight line passing through said through anchor and the connecting point where said lever is connected to the vehicle body; and
(h) said retractor including winding limiting means for limiting winding operation of said retractor to keep a predetermined length of said webbing unwound.

2. A seat belt device according to claim 1, wherein said predetermined length of said webbing is substantially equal to a distance from said movable end of the lever via said through anchor to said retractor at the time said lever is in said first and second positions.

3. A seat belt device according to claim 2, wherein said lever extends substantially horizontally adjacent to the floor of the vehicle body when said lever is in said second position, and extends forward and upwardly when said lever in said first position.

4. A seat belt device according to claim 3, wherein said lever is swingably connected to the floor of the vehicle body.

5. A seat belt device according to claim 3, wherein said lever is swingably connected to the seat.

6. A seat belt device according to claim 1, wherein said second end of said webbing is directly connected to said movable end of said lever.

7. A seat belt device according to claim 1, wherein said lever comprises a hollow member having a opening at a movable end thereof, said second end of said webbing is inserted into said hollow member through said opening, and a tip of said second end of said webbing is fixed to said hollow member.

* * * * *